United States Patent
Marvan

(10) Patent No.: US 12,520,816 B2
(45) Date of Patent: Jan. 13, 2026

(54) PET WASTE MANAGEMENT DEVICE, SYSTEM, AND METHODS

(71) Applicant: Francisco Javier Arreola Marvan, Washington, DC (US)

(72) Inventor: Francisco Javier Arreola Marvan, Washington, DC (US)

(*) Notice: Subject to any disclaimer, the term of this patent is extended or adjusted under 35 U.S.C. 154(b) by 0 days.

(21) Appl. No.: 19/055,425

(22) Filed: Feb. 17, 2025

(65) Prior Publication Data
US 2025/0261612 A1    Aug. 21, 2025

Related U.S. Application Data

(60) Provisional application No. 63/555,372, filed on Feb. 19, 2024.

(51) Int. Cl.
A01K 1/01    (2006.01)

(52) U.S. Cl.
CPC ............ A01K 1/011 (2013.01); A01K 1/0132 (2013.01)

(58) Field of Classification Search
CPC ........ A01K 1/011; A01K 1/0132; A01K 1/01; A01K 1/0107; A01K 1/0117; A01K 1/0128
See application file for complete search history.

(56) References Cited

U.S. PATENT DOCUMENTS

| | | | | |
|---|---|---|---|---|
| 3,793,988 A * | 2/1974 | Traeger | ................. | A01K 1/0117 119/164 |
| 4,574,735 A * | 3/1986 | Hohenstein | .......... | A01K 1/0114 209/616 |
| 5,048,465 A * | 9/1991 | Carlisi | ................... | A01K 1/011 119/161 |
| 5,477,812 A * | 12/1995 | Waters | ................. | A01K 1/0114 119/166 |
| 5,931,119 A * | 8/1999 | Nissim | ................. | A01K 1/0114 119/166 |
| 6,082,302 A * | 7/2000 | Thaler | ................. | A01K 1/0114 119/161 |
| 6,202,595 B1 * | 3/2001 | Atcravi | ............... | A01K 1/0114 119/165 |
| 6,205,954 B1 * | 3/2001 | Bogaerts | ............. | A01K 1/0114 119/166 |
| 6,286,459 B1 * | 9/2001 | Parr | ..................... | A01K 1/0114 119/168 |

(Continued)

FOREIGN PATENT DOCUMENTS

EP    1062868 B1    3/2006
KR    100583375 B1 *    5/2006
(Continued)

*Primary Examiner* — Monica L Perry
*Assistant Examiner* — Aaron M Rodziwicz
(74) *Attorney, Agent, or Firm* — PK Patent Law

(57) ABSTRACT

A pet waste management system provides a hygienic and convenient solution for pet owners. The pet waste management system includes a main housing portion and a non-porous pad having a surface for directly receiving pet excrement including feces and urine. The system includes a sweeper including a scraping surface and a movable sweeper arm. The movable sweeper arm is configured to move the sweeper across the surface of the non-porous pad such that the scraping surface directly pushes both feces and urine off of the non-porous pad and into a litter box portion.

20 Claims, 9 Drawing Sheets

(56) References Cited

U.S. PATENT DOCUMENTS

| | | | | |
|---|---|---|---|---|
| 6,951,190 B2* | 10/2005 | Northrop | ............. | A01K 1/0114 119/166 |
| 7,017,519 B1* | 3/2006 | Deasy | .................... | A01K 1/011 119/166 |
| 7,997,230 B2* | 8/2011 | Cook | ................... | A01K 1/0114 119/166 |
| 8,109,237 B1* | 2/2012 | Tsengas | ............... | A01K 1/0114 119/616 |
| 8,555,817 B2* | 10/2013 | Gordon | ................. | A01K 1/011 119/166 |
| 9,179,643 B2* | 11/2015 | Loveday | ................ | A01K 1/011 |
| 9,526,226 B2* | 12/2016 | Plazarte | ............. | A01K 1/0114 |
| 11,363,794 B2 | 6/2022 | Green | | |
| 2005/0172909 A1* | 8/2005 | Emery | .................. | B65G 25/02 119/166 |
| 2010/0122662 A1* | 5/2010 | Kennington | ........... | A01K 1/011 422/291 |
| 2010/0258056 A1* | 10/2010 | Hong | ..................... | A01K 1/011 119/167 |
| 2013/0192530 A1* | 8/2013 | Lovenvirth | ............ | A01K 1/011 119/165 |
| 2014/0069343 A1* | 3/2014 | Loveday | ............. | A01K 1/0132 119/166 |
| 2017/0231190 A1* | 8/2017 | Brawn | ................ | A01K 1/0114 119/166 |
| 2017/0339911 A1* | 11/2017 | Fitch | .................... | A01K 1/0125 |
| 2022/0046892 A1* | 2/2022 | Cook | ..................... | B32B 27/00 |

FOREIGN PATENT DOCUMENTS

| | | |
|---|---|---|
| KR | 10-1423739 B1 | 7/2014 |
| KR | 10-1796113 B1 | 11/2017 |
| WO | 2020256225 A1 | 12/2020 |

* cited by examiner

PET WASTE MANAGEMENT DEVICE, SYSTEM, AND METHODS

CROSS REFERENCE TO RELATED APPLICATION

The present application claims the benefit from earlier filed U.S. Provisional Patent Application No. 63/555,372, filed Feb. 19, 2024, which is incorporated herein in its entirety by reference.

FIELD OF THE INVENTION

The present teachings generally relate to pet waste disposal. In particular, the present teachings relate to a pet waste management device and system that deposits pet waste including both feces and urine directly into a litter box with minimal human interaction.

BACKGROUND OF THE INVENTION

In the realm of pet care, particularly concerning the management of waste elimination, existing solutions often lack efficiency and cleanliness. Traditional methods such as disposable pads or manual cleanup can be messy, time-consuming, and fail to adequately address odor and bacteria concerns. Turf pads do not adequately dispose of urine and reek almost instantaneously unless cleaned immediately after use. Known automatic cat litter boxes are designed in such a way that dogs would never use them because they are generally enclosed, and the pets that do use them have direct contact with the litter. As a result, the litter particulate is often scattered around the litter box requiring the pet owner to manually clean the surrounding area after use.

Accordingly, there exists a need for an improved system that streamlines the process of pet waste management including both feces and urine while ensuring a hygienic environment for both pets and their owners.

SUMMARY OF THE INVENTION

The present teachings provide a pet waste management system including a main housing portion and a non-porous pad arranged on the main housing portion. The non-porous pad including a surface for receiving pet excrement including feces and urine. A sweeper including a scraping surface and a movable sweeper arm configured to move the scrapping scraping surface of the sweeper across the surface of the non-porous pad such that the scraping surface is capable of pushing both feces and urine off of the non-porous pad.

The present teachings also provide a pet waste management system including a main housing portion including a proximal end and a distal end. A non-porous pad can be arranged on the main housing portion and include a series of upstanding ridges each separated by a gap. The ridges can extend from a proximal end to a distal end of the main housing portion. A sweeper defines a plurality of combed teeth, the combed teeth defining a complimentary contour with respect to the series of upstanding ridges and gaps formed in the non-porous pad. A movable sweeper arm can be configured to move the sweeper across the non-porous pad such that the series of combed teeth are capable of sweeping between the ridges of the non-porous pad thereby pushing both feces and urine off of the non-porous pad.

The present teachings still further provide a pet waste management system including a main housing portion and a non-porous pad arranged on the main housing portion. The non-porous pad includes a surface for receiving pet excrement including feces and urine. A sweeper including a scraping surface defining a first contour. The surface of the non-porous pad defines a second contour. The first contour and the second contour are shaped in a substantially complimentary manner such that the scraping surface of the sweeper is capable of pushing both feces and urine off of the non-porous pad.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

Figure 1:
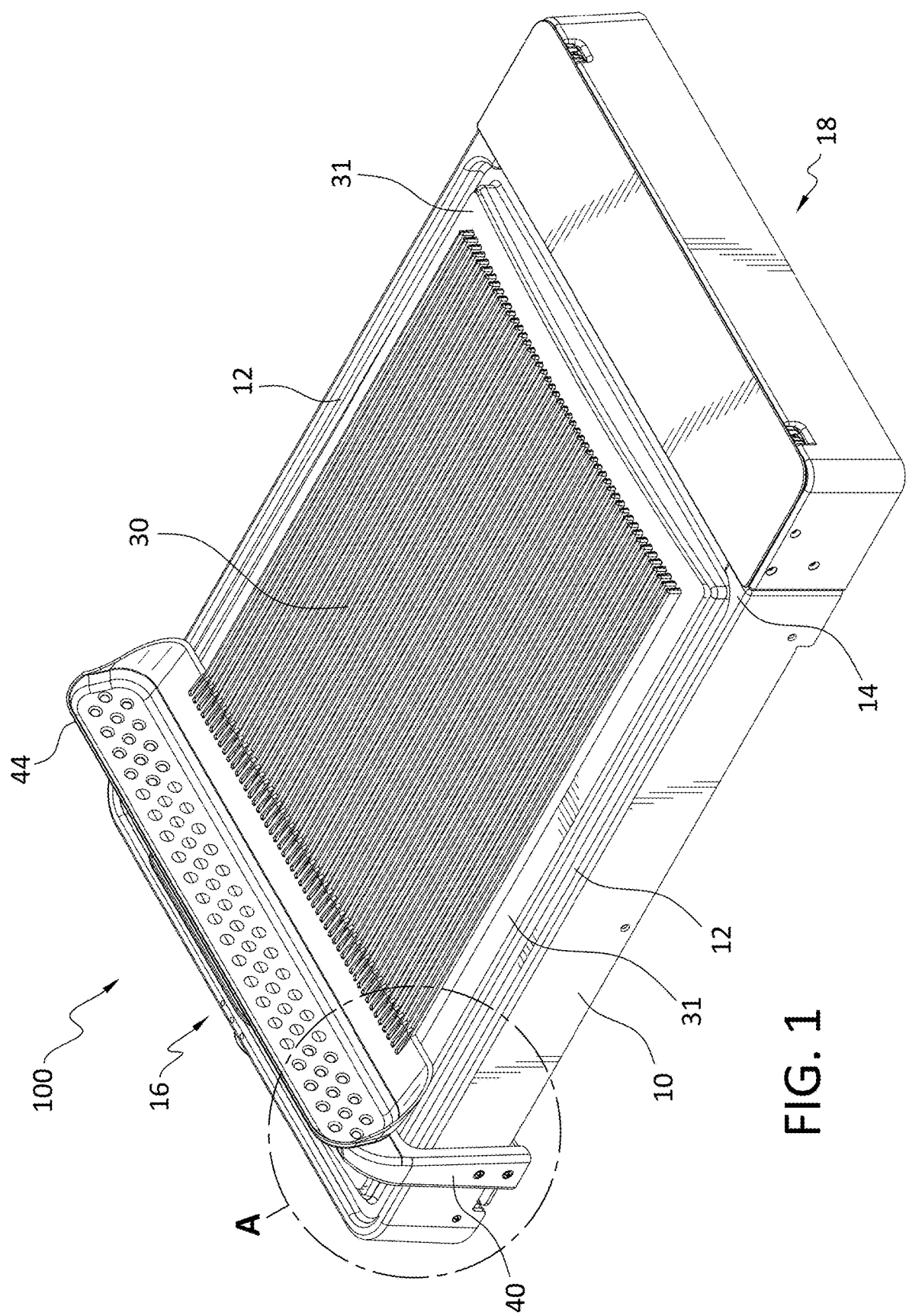
FIG. 1 shows a perspective view of the pet waste management system of the present teachings in the home position.

It is to be understood that both the foregoing general description and the following detailed description are exemplary and explanatory only and are intended to provide an explanation of various embodiments of the present teachings.

DETAILED DESCRIPTION OF THE PREFERRED EMBODIMENTS

Referring to FIGS. 1-6, a comprehensive pet waste management system 100 of the present teachings is shown. Pet waste management system 100 revolutionizes the way pet owners can handle indoor pet waste including both feces and urine. The pet waste management system 100 can be used by any type of trainable pet but is especially suited to handle the waste from dogs.

The pet waste disposal management system 100 of the present teachings can include a main housing portion 10. The main housing portion 10 can include surface engaging legs that can resist slippage during use and a top surface 14 that can securely support a removable non-porous pad 30. The non-porous pad 30 acts as a target area where a pet can relieve itself. During use, the non-porous pad 30 remains stationary and firmly supported on and with the top surface 14 of the main housing portion 10. As shown in FIG. 3C, the opposite side of the non-porous pad 30 can include resilient nubs 34 that can lock into apertures formed in the top surface 14 of the main housing portion 10 to securely hold the non-porous pad 30 in place during use.

Figure 5:
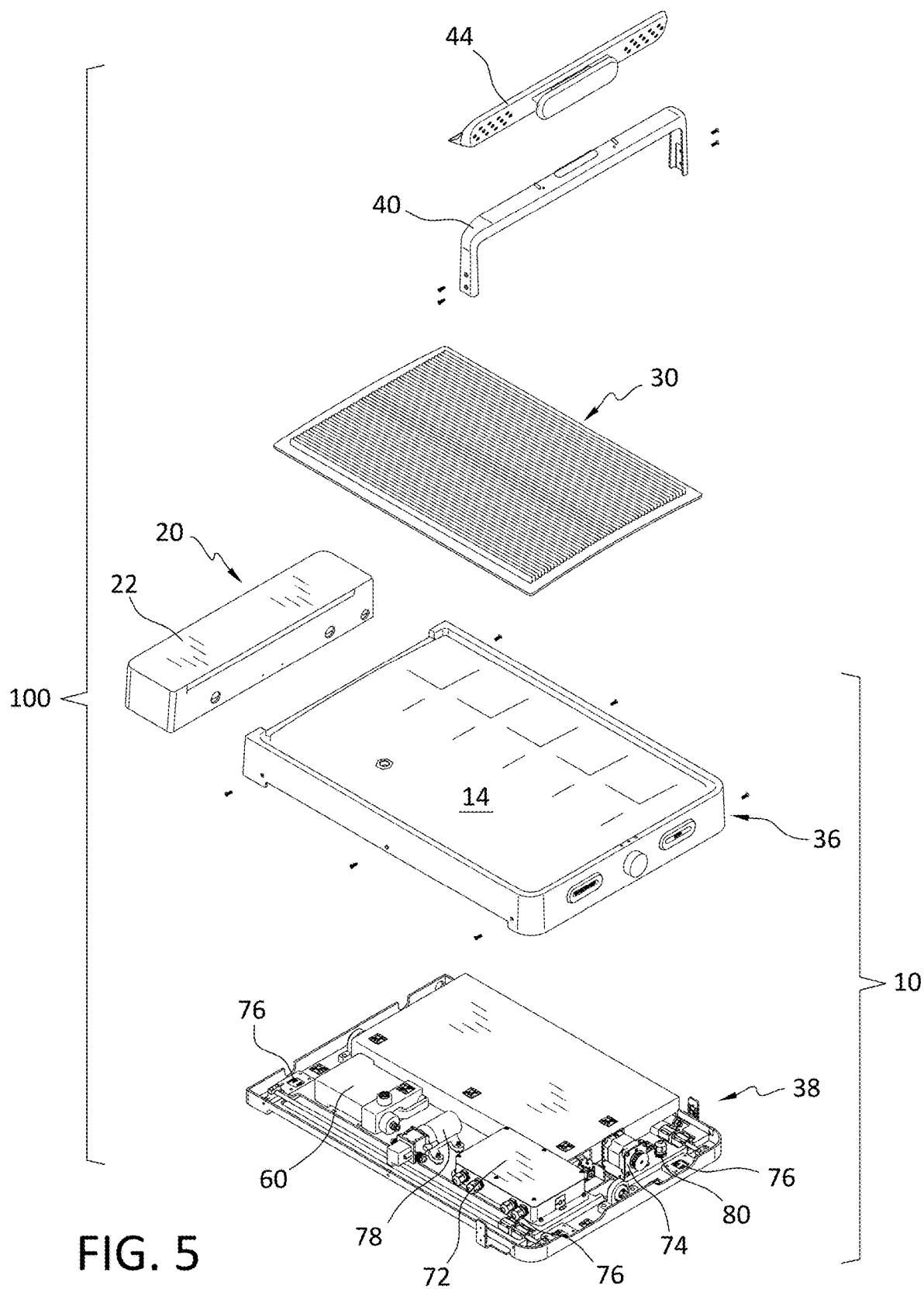
FIG. 5 shows an exploded view of the pet waste management system of FIG. 1.

As best shown in FIG. 5, the main housing portion 10 can include an upper assembly 36 and a lower assembly 38. The top surface 14 is formed in the upper assembly 36 of the main housing portion 10. As will be discussed in more detail below, the lower assembly 38 can include a cleaner supply tank 60, a programmable control system 72, motor 74, weight sensors 76, pump, 78, resistance sensor 80, as well as other subcomponents of the pet waste disposal management system 100 of the present teachings.

Figure 3A:
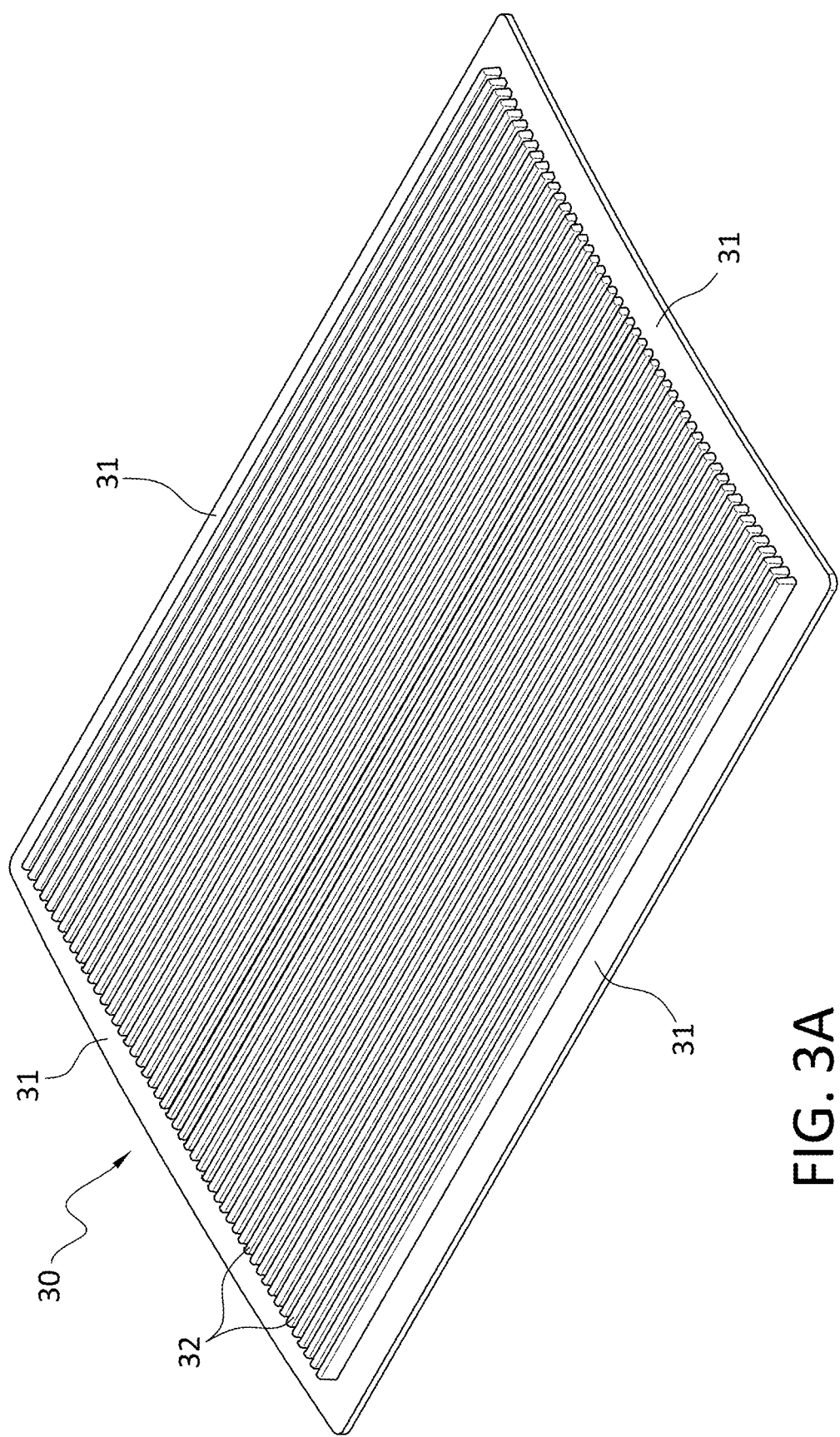
FIG. 3A shows a perspective view of the non-porous pad of the pet waste management system shown in FIG. 1.
Figure 3B:
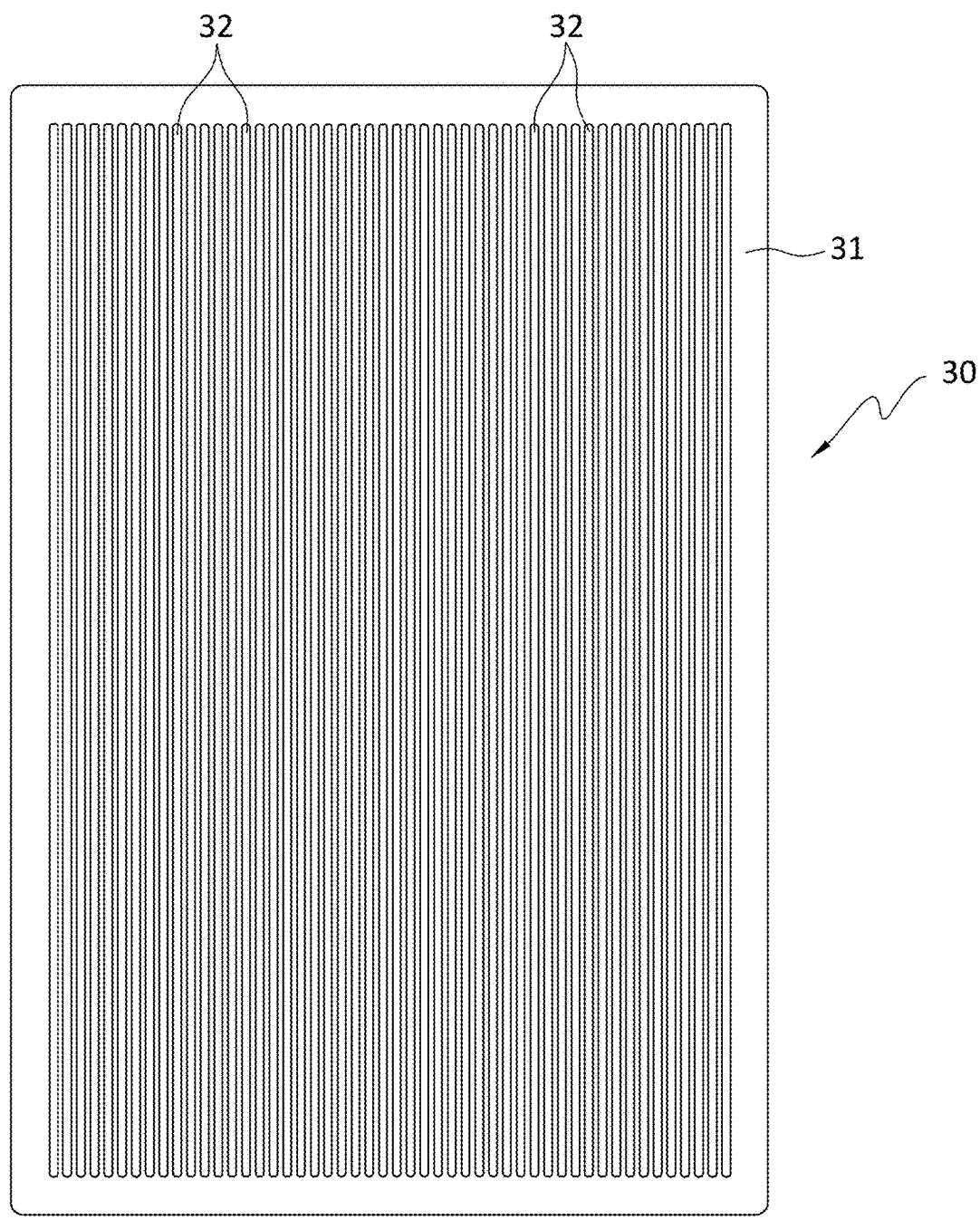
FIG. 3B shows a top view of the non-porous pad of FIG. 3A.
Figure 3C:
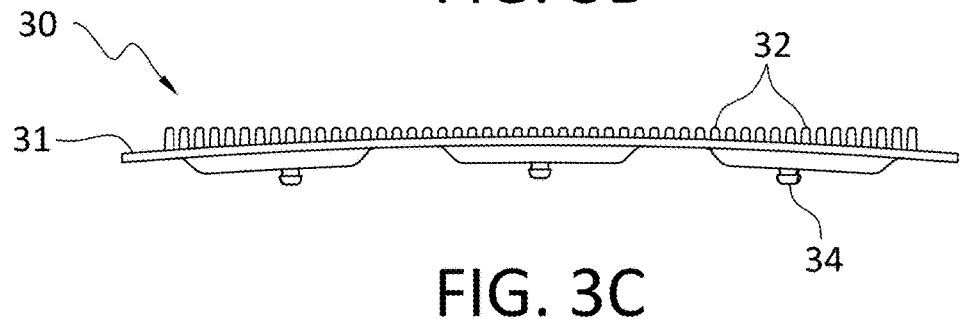
FIG. 3C shows an end view of the non-porous pad of FIGS. 3A and 3B.

Referring to FIGS. 3A-3C, the non-porous pad 30 can be made from a readily cleanable and durable material, such as, for example, silicone. The non-porous pad 30 can include a surface for receiving pet excrement including feces and urine. As will be discussed in more detail below, the surface of the non-porous pad 30 can be defined by a series of ridges 32 that form a contour as best shown in FIG. 3C.

For example, the non-porous pad 30 can include a generally planar base 31 with a series of ridges 32 that are spaced apart a set distance along their length. When secured to the upper assembly 36 of the main housing portion 10, the ridges 32 can run longitudinally between a proximal end 16 and a distal end 18 of the pet waste management system 100 of the present teachings. The ridges 32 can extend upwardly from the planar base 31 from about 5 mm to about 15 mm, and preferably can extend upwardly about 15 mm. The gaps between the ridges 32 can extend from about 5 mm to about 15 mm, and preferably can span about 15 mm. The non-porous pad 30 can roughly mimic grass and can minimize the surface area in contact with feces and urine thereby reducing the risk of contamination and simplifying cleanup.

As best shown in FIGS. 1 and 5-8, at the distal end 18 of the main housing portion 10, a litter box portion 20 can be removably secured and can be arranged for receiving the pet feces and urine that have been deposited on the non-porous pad 30. The removable litter box 20 can include an articulating cover 22 that can be opened and closed during a cleaning cycle as will be discussed in more detail below.

Figure 4A:
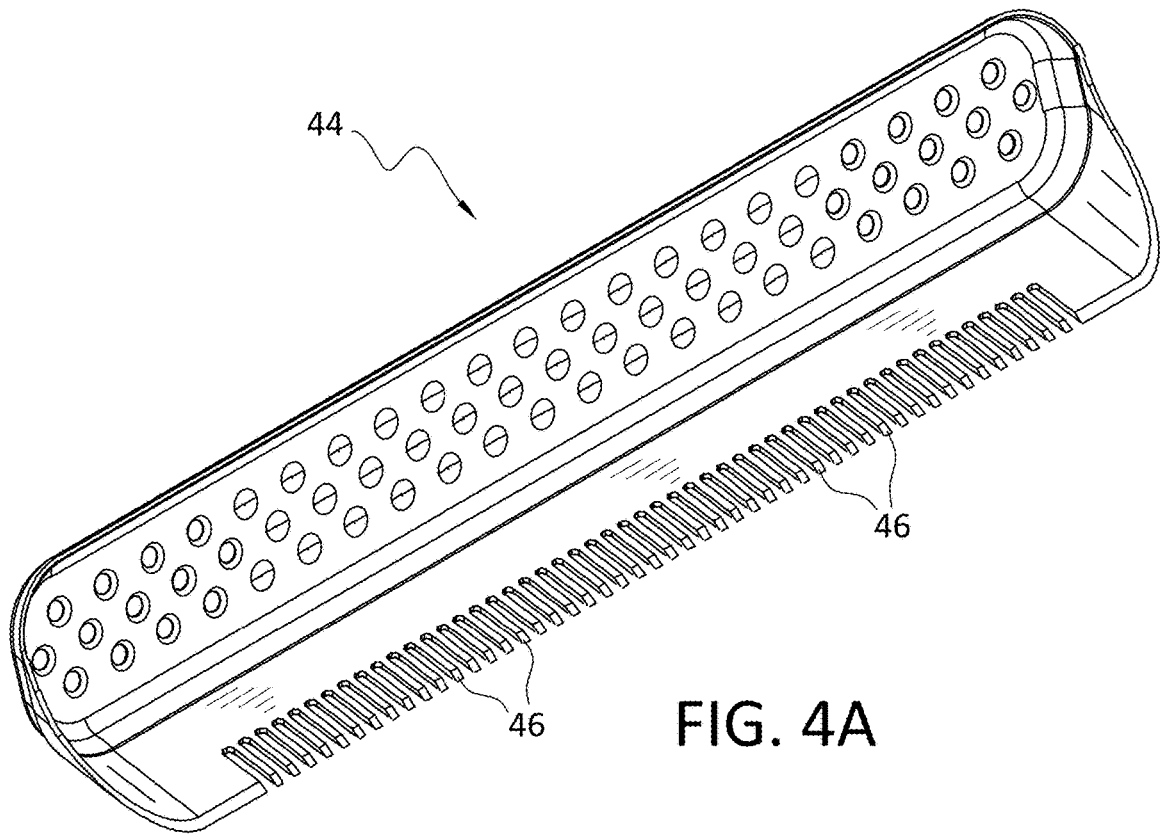
FIG. 4A shows a perspective view of the sweeper of the pet waste management system of FIG. 1.
Figure 4B:
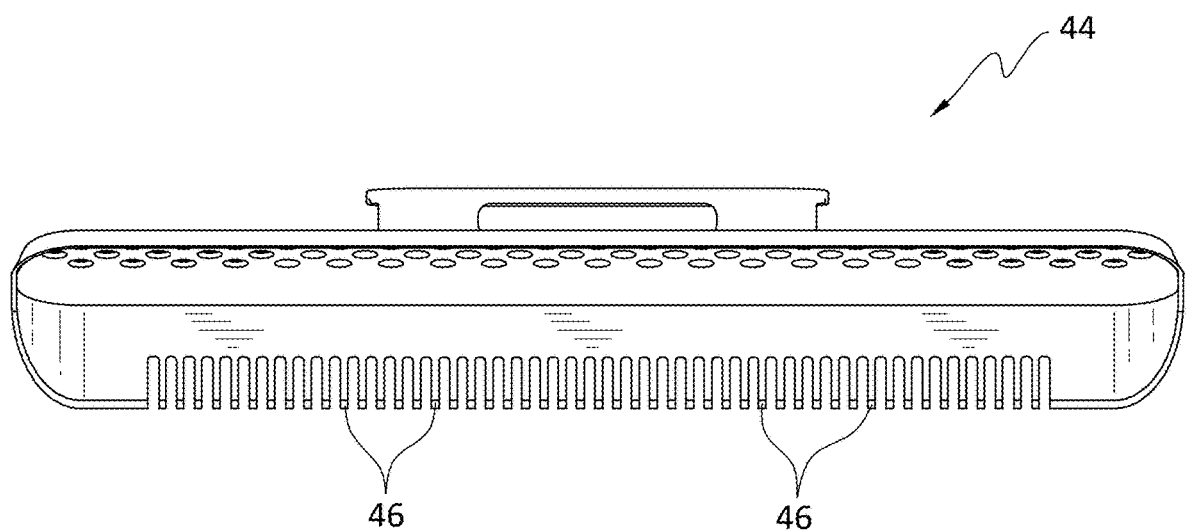
FIG. 4B shows a top view of the sweeper shown in FIG. 4A.

The pet waste management system 100 of the present teachings can include a mechanical sweeper arm 40. The mechanical sweeper arm 40 can support a sweeper 44 that defines a scraping surface, such as, for example, by way of a series of combed teeth 46. The scraping surface defined by the series of combed teeth 46 forms a contour as best shown in FIGS. 4A and 4B. The scraping surface of the sweeper 44 and the surface of the non-porous pad 30 can define complimentary shaped contours which allow both feces and urine to be substantially, if not completely, pushed off of the non-porous pad 30 and into the litter box 20 by the sweeper 44.

Figure 2:
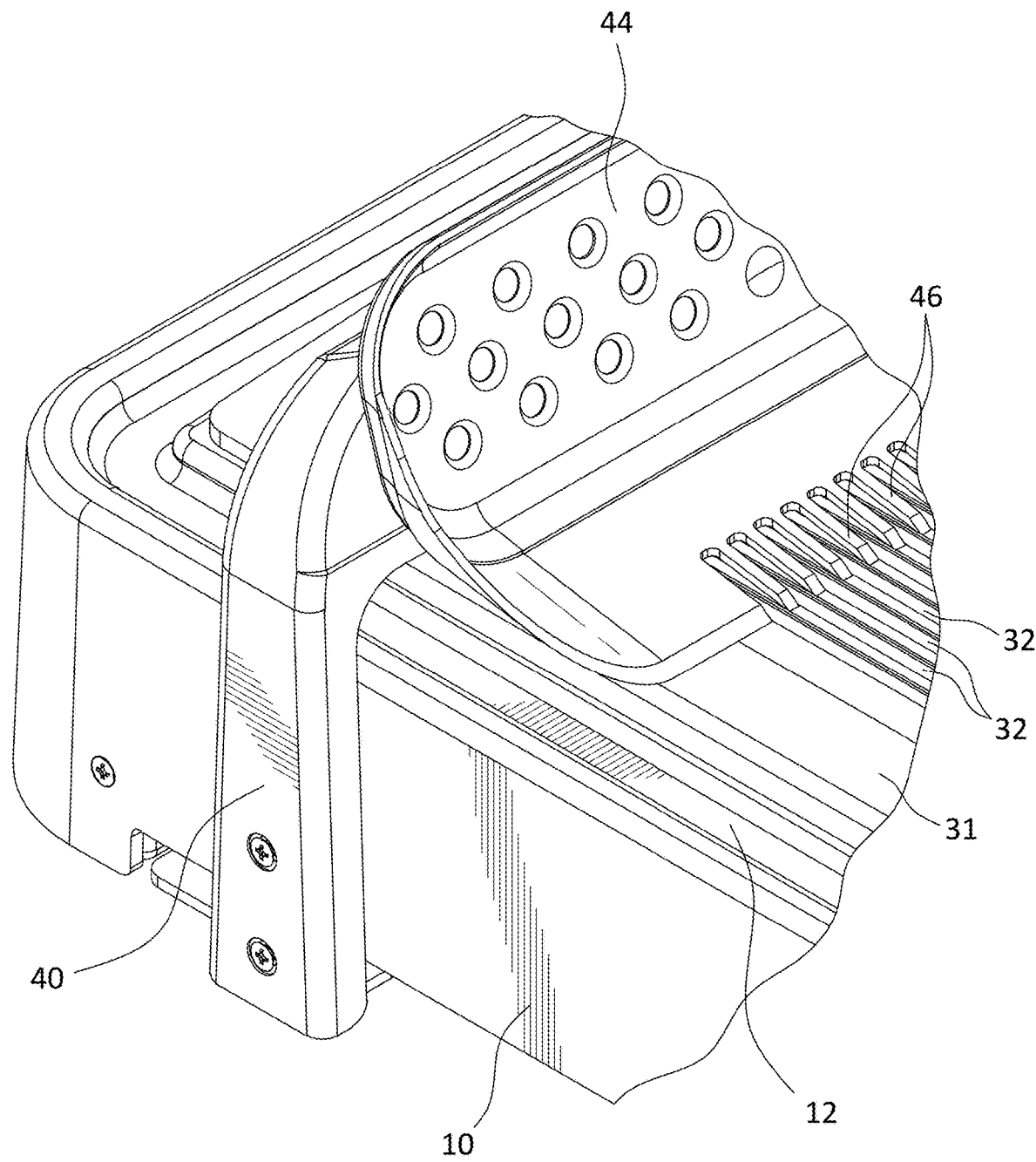
FIG. 2 shows a blown-up view of portion A of the pet waste management system shown in FIG. 1.

As best shown in FIGS. 2, 4A, and 4B, the series of combed teeth 46 can be sized and shaped to substantially mate with the longitudinally extending ridges 32 of the non-porous pad 30. In the operative position of the sweeper 44, and as best shown in FIG. 2, the series of combed teeth 46 are shaped and arranged to substantially mate with the gaps between ridges 32 of the non-porous pad 30 so as to comb between the ridges and push all pet excrement (both solids and liquids) off of the non-porous pad 30 and into the removable litter box portion 20 of the pet waste management system 100.

Figure 8:
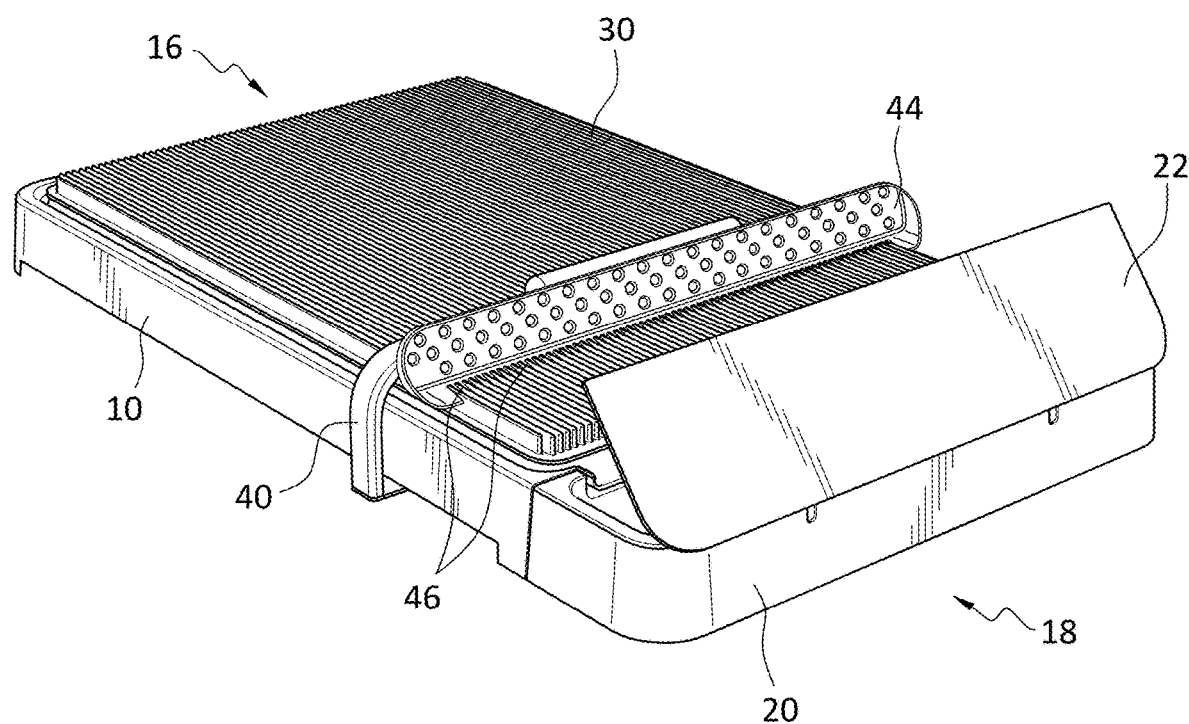

More specifically, the motor 74 can be mechanically arranged (via any mechanical linkage or transmission) and programmed to move the mechanical sweeper arm 40 from a home position, generally located at the proximal end 16 of the main housing portion 10 (see FIGS. 1 and 6), to the distal end 18 substantially adjacent to litter box portion 20, shown in FIG. 8. The mechanical sweeper arm 40 can be arranged to ride in or on rails arranged on or below the upper assembly 36, or any other guiding structure, as would be appreciated by one of ordinary skill in the art. After the sweeper 44 pushes and then deposits all the pet feces and urine into the litter box portion 10, the sweeper arm 40 moves back to the initial home position. As the sweeper arm 40 moves the sweeper 44 over the non-porous pad 30, the non-porous pad 30 remains stationary and firmly held on the top surface 14 of the main housing portion 10. This complete motion can be referred to as a "cleaning cycle" and can be programmed to occur after the pet has relieved itself, stepped off the main housing portion 10, and a predetermined time has elapsed.

To let gravity help direct both solid and liquid excrement off of the non-porous pad 30 and into the litter box portion 20, the top surface 14 of the main housing portion 10 can be pitched downwardly from the proximal end 16 to the distal end 18 of the pet waste management system 100. The top surface 14 could also be pitched outwardly on both sides of the main housing portion 10. On either side of the non-porous pad 30, the main housing portion 10 can include one or more fluid channels 12 that can be arranged to receive run-off from the non-porous pad 30 and direct the run off into the removable litter box portion 20.

As best shown in FIG. 8, the removable litter box 20 can include an articulating cover 22 that can be programmed and/or mechanically configured to selectively open to receive both pet feces and urine as the sweeper arm 40 (and sweeper 44) reach the distal end 18 of the main housing portion 10. When the sweeper arm 40 retracts back to the home position, the articulating cover 22 can be configured to close to help contain smells when the pet waste disposal management system 100 is not in use. When getting the pet waste management system 100 ready for use, the pet owner can supply the removable litter box portion 20 with cat litter to help absorb and contain smells.

Figure 6:
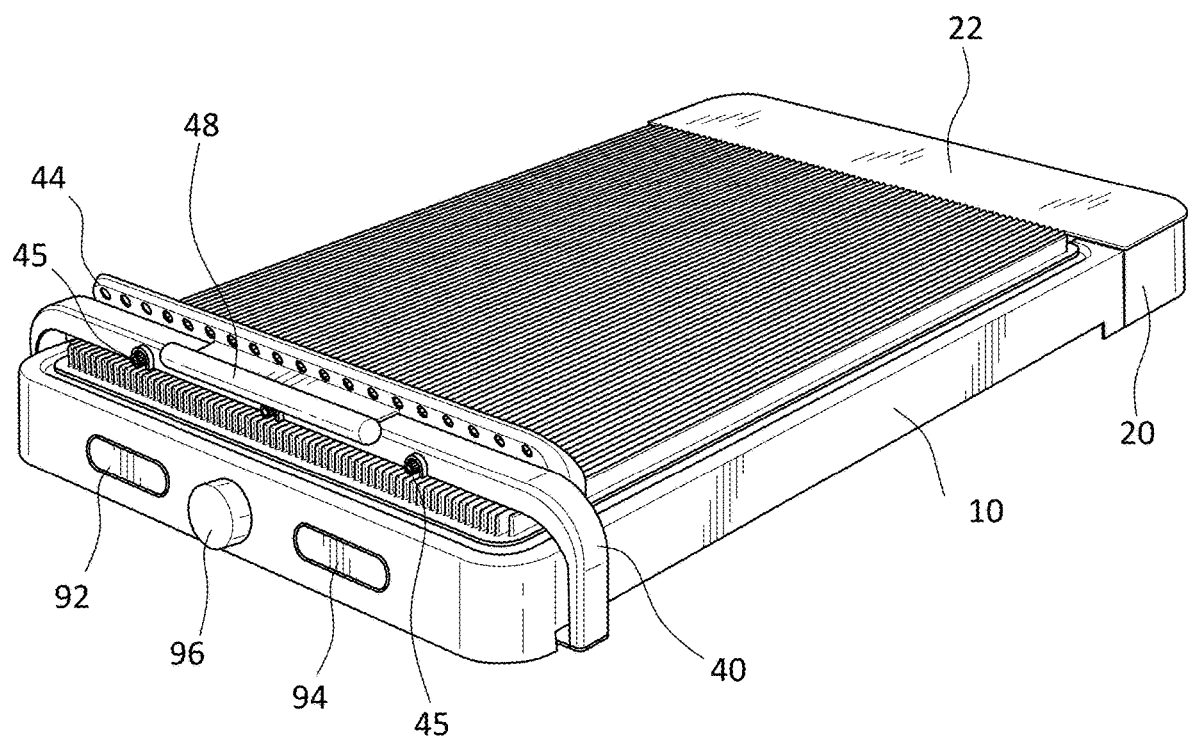
FIG. 6 shows a perspective view of the back side of the pet waste management system of FIG. 1 shown in the home position.
Figure 7:
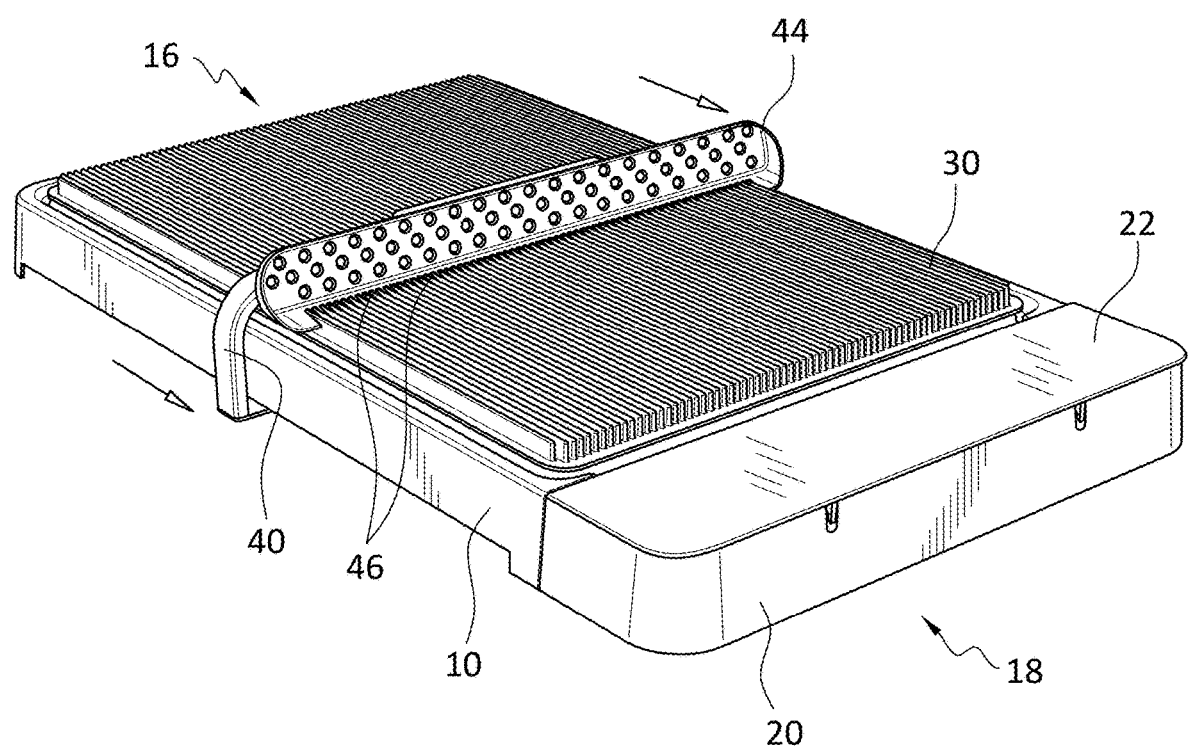
FIGS. 7 and 8 each show a perspective view of the pet waste management system of FIG. 1 with the sweeper arm shown in different positions of a cleaning cycle.

Referring to FIG. 6, the liquid supply tank 60 can be in fluid communication with one or more sprayer nozzles 45 arranged on the sweeper arm 40. The pump 78 can be programmed to deliver an enzymatic cleaner via the nozzles 45 across the surface of the non-porous pad 30 as the sweeper arm 40 moves across the surface of the non-porous pad 30 during a cleaning cycle. The enzymatic cleaner cleans and disinfects the surface of the non-porous pad 30 and reduces odors. The pump 78 can also be programmed to deliver the enzymatic cleaner via the nozzles 45 at any time.

As also shown in FIG. 6, the sweeper arm 40 can include one or more UV light devices 48 that are arranged to disinfect the non-porous pad 30 as the sweeper arm 40 moves across the surface during a cleaning cycle. For example, the UV light devices 48 can be chosen to emit UVC light in a wavelength range of from about 200 nm to about 280 nm which is the most germicidal part of the UV spectrum.

The removable litter box 20 can include one or more UV light devices that are arranged to disinfect the interior of the litter box 20 at any time during or after the cleaning cycle.

A variety of different motors, sensors, pumps, and controllers for coordinating the movement and operation of the sweeper arm 40, sprayer nozzles 45, articulating cover 22, UV light devices 48 and other features of system 100 can be contained in and/or supported by the main housing portion 10.

For example, FIG. 5 shows a programmable control system (or CPU) 72 that can be located on the main housing portion 10 and connected to a motor 74 and a pump 78 with the external control system 72 functioning to control and operate the sweeper arm 40, sprayer nozzles 45, articulating cover 22, UV light devices 48, and any other structure. Any power source can be connected to the motor 74 to provide the necessary power for the operation of the pet waste management system 100 of the present teachings.

Programmable external control system 72 could include a remote-control unit that could allow a pet owner to operate and program various safety features of the pet waste disposal management system 100, such as but not limited to, a weight sensor 76 and a resistance sensor 80.

Weight sensor 76 could be programmed to run the motor 74 a predetermined time after the pet defecates and then jumps off the main housing portion 10. Pet owners could choose from pre-programmed intervals to activate the cleaning cycle after use ranging from, for example, 10 seconds to one hour. Such a programmable feature can allow pets to walk away from the non-porous pad 30 before the cleaning cycle is activated, promoting a stress-free experience. The weight sensor 76 could also be arranged to prevent motor 74 and pump 78 from turning on when there is a designated amount of weight on the main housing portion 10, thereby recognizing that the pet is standing on the device.

Resistance sensor 80 could be programmed to de-activate the motor 74 and pump 78 upon detection of any electrical resistance thereby automatically stopping the cleaning cycle and preventing any potential accidents and ensuring the safety of pets.

Similar safety features could include a mechanism for sensing any type of pressure or movement on the sweeper arm 40, a motion detector, light sensors, weight sensor, or other feedback mechanisms which will turn off the motor 74 and pump 78 and/or disengage the motor 74 under predetermined conditions.

Programmable control system 72 can operate and can be programmed to control a heating system and any other electronic mechanisms on the pet waste management system 100. Although not shown, the heating system can include weather and waterproof heating elements located on, or embedded within, various components of the pet waste management system 100. The heating system functions to prevent freezing when used in cold weather climates. For example, a heating system of the pet waste management system 100 can include heating elements that are mounted in such a way as to prevent the sweeper arm 40, sprayer nozzles 45, motor 74, pump 78, and other mechanisms from freezing.

User-actuatable controls can be arranged anywhere on the main housing portion 10 or on a remote. For example, as shown in FIG. 6, such buttons could include an ON/OFF button 92, a reset button 94, and a control knob 96 for adjusting the timing of the cleaning cycle.

In the general operation of pet waste management system 100 of the present teachings, a pet will deposit feces and/or urine on the non-porous pad 30 and then jump off the main housing portion 10. A predetermined period of time after sensing a change in weight, a signal can be sent to motor 74, such as by way of the programmable control system 72, to move the sweeper arm 40 (and sweeper 44) across the stationary surface of the non-porous pad 30 to perform a complete cleaning cycle. The control system 72 can also send a signal to control the angular movement of the articulating cover 22 from a closed position to an opened position in coordination with the location of the sweeper arm 40 to allow the swept pet waste to be received within the litter box portion 20 and then closed.

Simultaneously, to help move the pet waste into the litter box portion 20, the pump 78 can be activated during the cleaning cycle to spray enzymatic cleaner from the sprayer nozzles 45 onto the non-porous pad 30. Spraying a continuous stream of enzymatic cleaner onto the non-porous pad 30 helps to remove any remaining pet waste from the non-porous pad 30 and provides a disinfecting function.

The non-porous pad 30 and litter box portion 20 can be easily removable and replaceable, simplifying the cleanup process and ensuring ongoing functionality.

The pet waste disposal system 100 of the present teachings eliminates odors and bacteria by spraying an enzyme solution over the entire surface of the stationary pad 30 during the cleaning cycle. The combination of the movement of the mechanical sweeper arm 40 and the complimentary contoured shapes of the scraping surface of the sweeper and the surface of the non-porous pad 30 operate to allow the capture of both feces and urine into a single closeable container 20. This makes the pet waste disposal system 100 an effective and efficient pet waste apparatus that is easy to maintain and clean.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A pet waste management system comprising:
    a main housing portion;
    a non-porous pad arranged on the main housing portion and including a surface for directly receiving pet excrement including feces and urine;
    a sweeper including a scraping surface; and
    a movable sweeper arm configured to move the scraping surface of the sweeper across the surface of the non-porous pad such that the scraping surface is capable of directly pushing both feces and urine off of the non-porous pad.

2. The pet waste management system of claim 1, wherein the surface of the non-porous pad and the scraping surface of the sweeper define complimentary shaped contours.

3. The pet waste management system of claim 2, wherein the surface of the non-porous pad is defined by a series of ridges separated by a gap.

4. The pet waste management system of claim 3, wherein the scraping surface is defined by a series of combed teeth being shaped to extend into the gaps formed between the ridges of the non-porous pad.

5. The pet waste management system of claim 1, further including a removable litter box portion arranged to receive both feces and urine pushed off the non-porous pad by the sweeper.

6. The pet waste management system of claim 5, wherein the removable litter box portion includes an articulating cover configured to open and close based on the location of the sweeper arm.

7. The pet waste management system of claim 1, further including at least one sprayer arranged on the movable sweeper arm capable of spraying an enzymatic cleaner onto the non-porous pad.

8. The pet waste management system of claim 1, further including at least one UV light device arranged on the movable sweeper arm capable of disinfecting the non-porous pad.

9. A pet waste management system comprising:
a main housing portion including a proximal end and a distal end;
a non-porous pad arranged on the main housing portion, the non-porous pad including a series of upstanding ridges each separated by a gap, the ridges extending from a proximal end to a distal end of the main housing portion;
a sweeper defining a plurality of combed teeth, the combed teeth defining a complimentary contour with respect to the series of upstanding ridges and gaps formed in the non-porous pad; and
a movable sweeper arm configured to move the sweeper across the non-porous pad such that the series of combed teeth are capable of sweeping between the ridges of the non-porous pad thereby directly pushing both feces and urine off of the non-porous pad.

10. The pet waste management system of claim 9, further including a removable litter box portion arranged to receive both feces and urine pushed off the non-porous pad by the sweeper.

11. The pet waste management system of claim 10, wherein the removable litter box portion includes an articulating cover configured to open and close based on the location of the sweeper arm.

12. The pet waste management system of claim 9, further including at least one sprayer arranged on the movable sweeper arm capable of spraying an enzymatic cleaner onto the non-porous pad.

13. The pet waste management system of claim 9, further including at least one UV light device arranged on the movable sweeper arm capable of disinfecting the non-porous pad.

14. A pet waste management system comprising:
a main housing portion;
a non-porous pad arranged on the main housing portion and including a surface for directly receiving pet excrement including feces and urine; and
a sweeper including a scraping surface;
wherein the scraping surface of the sweeper defines a first contour and the surface of the non-porous pad defines a second contour whereby the first contour and the second contour are shaped in a substantially complimentary manner such that the scraping surface of the sweeper is capable of directly pushing both feces and urine off of the non-porous pad.

15. The pet waste management system of claim 14, wherein the second contour defined by the non-porous pad is formed by a series of ridges separated by a gap.

16. The pet waste management system of claim 15, wherein the first contour defined by the scraping surface is formed by a series of combed teeth.

17. The pet waste management system of claim 14, wherein the first contour defined by the scraping surface is formed by a series of combed teeth.

18. The pet waste management system of claim 17, wherein the series of combed teeth are shaped to extend into gaps formed between ridges defining the second contour of the non-porous pad.

19. The pet waste management system of claim 14, further including a removable litter box portion arranged to receive both feces and urine pushed off the non-porous pad by the sweeper.

20. The pet waste management system of claim 19, wherein the removable litter box portion includes an articulating cover configured to open and close based on the location of the sweeper arm.

* * * * *